United States Patent
Dagan et al.

(10) Patent No.: US 9,740,218 B2
(45) Date of Patent: Aug. 22, 2017

(54) LIMITING A CURRENT

(71) Applicant: Intersil Americas LLC, Milpitas, CA (US)

(72) Inventors: Marc Ethan Dagan, Mountain View, CA (US); Ruchi Parikh, Mountain View, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 386 days.

(21) Appl. No.: 13/828,833

(22) Filed: Mar. 14, 2013

(65) Prior Publication Data

US 2014/0125303 A1 May 8, 2014

Related U.S. Application Data

(60) Provisional application No. 61/721,790, filed on Nov. 2, 2012.

(51) Int. Cl.
*G05F 1/10* (2006.01)
*H02M 3/156* (2006.01)

(52) U.S. Cl.
CPC ............. *G05F 1/10* (2013.01); *H02M 3/156* (2013.01)

(58) Field of Classification Search
CPC .......... G05F 1/10; G05F 1/614; H02M 3/156; H02M 3/158; H02M 1/32; H03K 17/0822; H02H 9/025
USPC ....... 323/222, 223, 271, 282, 284, 285, 908; 361/93.9
See application file for complete search history.

(56) References Cited

U.S. PATENT DOCUMENTS

| | | | | |
|---|---|---|---|---|
| 8,283,907 B1 * | 10/2012 | Jayaraj | ................ | H02M 3/156 323/282 |
| 2003/0095368 A1 * | 5/2003 | Daniels et al. | ............. | 361/93.9 |
| 2009/0295339 A1 * | 12/2009 | Wong | ................... | H02J 7/0052 320/162 |
| 2009/0322300 A1 * | 12/2009 | Melanson | .......... | H02M 3/1563 323/284 |
| 2011/0254524 A1 * | 10/2011 | Ishii | ..................... | H02M 3/156 323/282 |
| 2012/0308218 A1 * | 12/2012 | Galloway | ............ | H02M 3/156 396/206 |

(Continued)

OTHER PUBLICATIONS

Boost, Flyback, SEPIC and Inverting Converter with 5A, 40V Switch, Linear Technology, Linear Technology Corporation 2010; LT3957, pp. 28.

(Continued)

*Primary Examiner* — Gustavo Rosario Benitez
(74) *Attorney, Agent, or Firm* — Foley & Lardner LLP; Mark J. Danielson (57) ABSTRACT

In an embodiment, a power-supply controller includes a switching regulator and a current limiter. The switching regulator is configured to generate an input current such that an output voltage is generated in response to the input current and an input voltage, and the current limiter is configured to limit the input current in response to a quantity that is related to a ratio of the output voltage divided by the input voltage. For example, an embodiment of such a power-supply controller may be able to limit the output or load current from a power supply to a set level by limiting the input current in response to a quantity that is related to the ratio (e.g., the boost ratio) of the output voltage to the input voltage.

38 Claims, 8 Drawing Sheets

(56) References Cited

U.S. PATENT DOCUMENTS

| | | | | |
|---|---|---|---|---|
| 2013/0069613 A1* | 3/2013 | Nakase et al. | ............... | 323/284 |
| 2013/0077362 A1* | 3/2013 | Kumar | ............... | 363/49 |
| 2013/0321076 A1* | 12/2013 | Galbis | ............... | H03F 1/0216 |
| | | | | 330/127 |
| 2014/0197811 A1* | 7/2014 | Qiu | ............... | H02M 3/1582 |
| | | | | 323/282 |

OTHER PUBLICATIONS 1.2A High Efficiency Buck-Boost Regulators, ISL9110, ISL9112, Intersil Americas Inc., Jul. 13, 2012, pp. 20, see www.intersil.com.
Low Input Voltage, High Efficiency Synchronous Boost Converter with 1A Switch, ISL9111, ISL9111A, Intersil Americas Inc., Jun. 4, 2012, pp. 15, see www.intersil.com.
Low Input Voltage and High Efficiency Synchronous Boost Converter with 1.3A Switch, ISL9113, Intersil Americas Inc., Feb. 28, 2013, pp. 15, see www.intersil.com.
6-Phase Interleaved Boost PWM Controller with Light Load Efficiency Enhancement, ISL78220, Intersil Americas Inc., Jan. 30, 2013, pp. 22, see www.intersil.com.

* cited by examiner

LIMITING A CURRENT

PRIORITY CLAIM

This application claims priority from provisional patent application No. 61/721,790, filed 2 Nov. 2012, which is incorporated in its entirety herein by reference.

SUMMARY

In an embodiment, a power-supply controller includes a switching regulator and a current limiter. The switching regulator is configured to generate an input current such that an output voltage is generated in response to the input current and an input voltage, and the current limiter is configured to limit the input current in response to a quantity that is related to a ratio of the output voltage divided by the input voltage.

For example, an embodiment of such a power-supply controller may be able to limit the output or load current from a power supply to a defined level in response to a quantity that is related to the ratio of the output voltage to the input voltage. Where the power supply is a boost converter that generates an output voltage having a magnitude that is greater than the magnitude of the input voltage, then this ratio is the boost ratio of the power supply.

DETAILED DESCRIPTION

Figure 1:
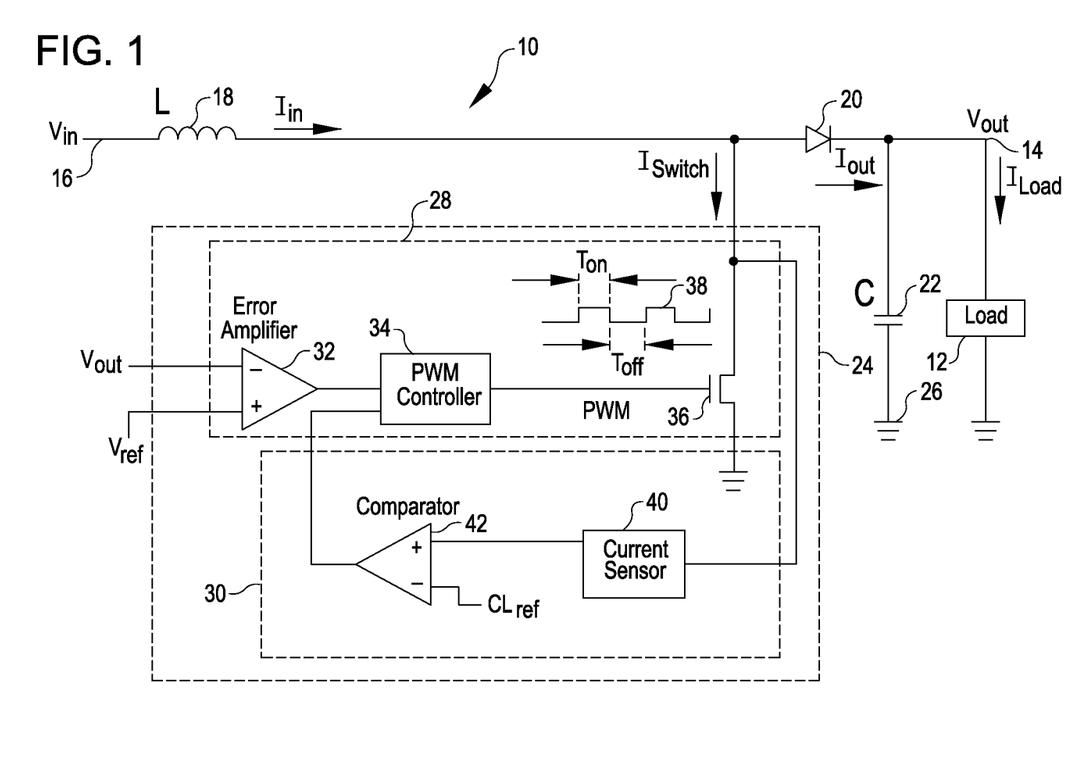
FIG. 1 is a diagram of power supply that includes a power-supply controller, according to an embodiment.

FIG. 1 is a schematic diagram of a boost converter power supply 10, and of a load 12 that is powered by the power supply, according to an embodiment.

The power supply 10 is configured to generate, in a normal operation mode, an output voltage, e.g., a regulated output voltage, $V_{out}$ on a node 14 in response to an input voltage $V_{in}$ on a node 16, and includes a filter inductor 18 having an inductance L, a unidirectional-current component (here a diode) 20, a filter capacitor 22 having a capacitance C, a power-supply controller 24, and a reference node (here a ground node) 26.

The power-supply controller 24 includes a switching regulator 28 configured to generate, or to cause the generating of, input, switch, output, and load currents $I_{in}$, $I_{switch}$, $I_{out}$, and $I_{load}$, and includes a current limiter 30 configured to limit $I_{out}$ and $I_{load}$ during a current-limiting mode by limiting $I_{switch}$, and, therefore, $I_{in}$, to respective values set by a current-limit reference $CL_{ref}$.

The switching regulator 28 includes an error amplifier 32, a pulse-width-modulation (PWM) controller 34, and a NMOS switching transistor 36. During a normal mode of operation, the error amplifier 32 generates an error signal in response to the regulated output voltage $V_{out}$ and a reference voltage $V_{ref}$, and, in response to the error signal, the PWM controller 34 generates, and adjusts the duty cycle of, a control signal 38, which drives the gate of the transistor 36 so as to regulate $V_{out}$ to a voltage level (e.g., 12 Volts) that is set by $V_{ref}$.

And the current limiter 30 includes a current sensor 40 and a limit comparator 42. During a current-limiting mode of operation caused by, for example, a low-impedance path through, or around, the load 12, if $I_{switch}$ (e.g., the peak or average of $I_{switch}$) is greater than the current-limit reference $CL_{ref}$, then the comparator 42 generates, at its output, a current-limit signal having a logic-high level that causes the PWM controller 34 to transition the switching-control signal 38 to a logic-low level so as to turn the transistor 36 "off". Limiting $I_{switch}$ in this manner may prevent damage to, e.g., the transistor 36. And, because limiting $I_{switch}$ inherently limits $I_{out}$ and $I_{load}$, limiting $I_{switch}$ in this manner may also prevent damage to the load 12.

Figure 2:
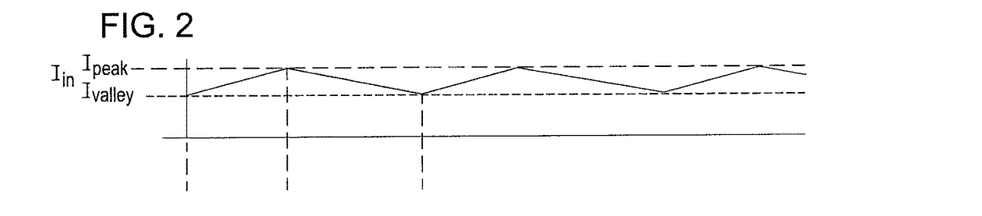
FIG. 2 is a time plot of the input current of the power supply of FIG. 1 while operating in a normal mode, according to an embodiment.

FIG. 2 is a time plot of the input current $I_{in}$ of FIG. 1 while the power supply 10 of FIG. 1 is operating in a normal mode, according to an embodiment.

Figure 3:
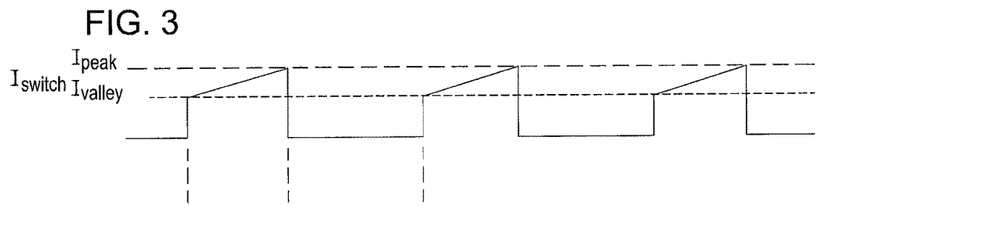
FIG. 3 is a time plot of the switch current of the power supply of FIG. 1 while operating in a normal mode, according to an embodiment.

FIG. 3 is a time plot of the switch current $I_{switch}$ of FIG. 1 while the power supply 10 of FIG. 1 is operating in a normal mode, according to an embodiment.

Figure 4:
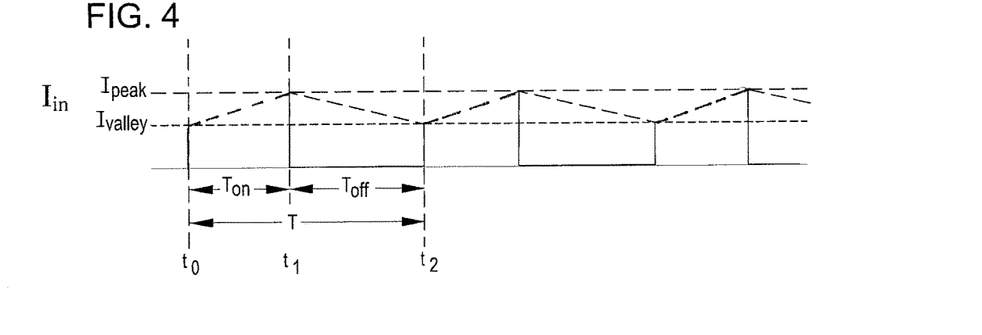
FIG. 4 is a time plot of both the input and switch currents of the power supply of FIG. 1 while operating in a normal mode, according to an embodiment.

FIG. 4 is a time plot of both the input current $I_{in}$ of FIG. 2 and the switch current $I_{switch}$ of FIG. 3 while the supply 10 of FIG. 1 is operating in a normal mode, according to an embodiment; $I_{in}$ is shown in dashed line, $I_{switch}$ is shown in solid line, and where $I_{in}$ and $I_{switch}$ are equal is shown in bold dashed line.

Referring to FIGS. 2-4, during a first portion $T_{on}$ of a switching period T of the transistor 36 (FIG. 1)—$T_{on}$ corresponds to the logic-high portion of the control signal 38 of FIG. 1—the transistor conducts the current $I_{switch}=I_{in}$ from $V_{in}$ through the inductor 18. Because the change in current, di/dt, through an inductor equals the voltage across the inductor over the inductance of the inductor, during $T_{on}$, $I_{switch}=I_{in}$ ramps up linearly from a valley level $I_{valley}$ at a time $t_0$ to a peak level $I_{peak}$ at a time $t_1$ with a slope of $V_{in}/L$, where $V_{in}$ is the voltage across the inductor 18 (with the assumption that the voltage drop across the "on" transistor 36 is negligible) and L is the inductance of the inductor.

At the time $t_1$, the transistor 36 turns "off" such that $I_{switch}$ rapidly decreases to zero and $I_{in}$ begins to decrease with a slope of $(V_{out}-V_{in})/L$, where $V_{out}-V_{in}$ is the voltage across the inductor 18 (with the assumption that the voltage drop across the diode 20 is negligible).

During a second portion $T_{off}$ of the switching period T of the transistor 36 (FIG. 1)—$T_{off}$ corresponds to the logic-low portion of the control signal 38 of FIG. 1—the transistor conducts no current, and, therefore, $I_{switch}$ remains at zero and $I_{in}$ continues to ramp down at a rate of $(V_{out}-V_{in})/L$, until a time $t_2$, which is the beginning of the next normal-mode switching cycle.

Figure 5:
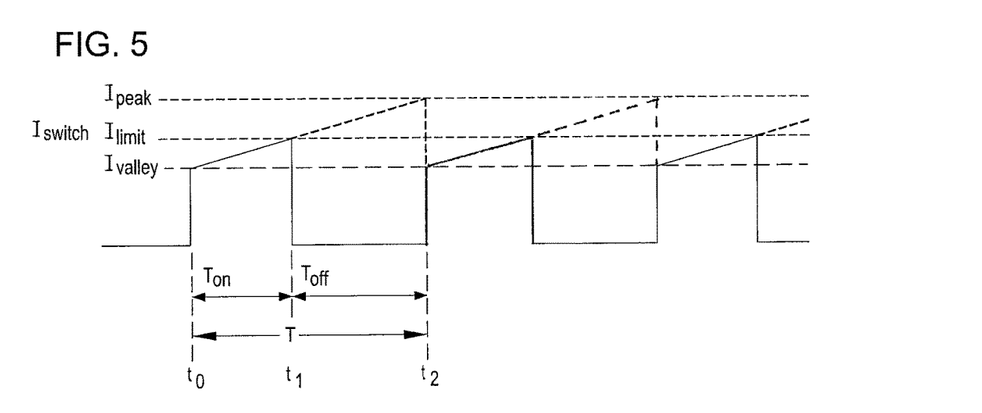
FIG. 5 is a time plot of the switch current of the power supply of FIG. 1 while operating in a current-limiting mode, according to an embodiment.

FIG. 5 is a time plot of the switch current $I_{switch}$ of FIG. 1 while the power supply 10 is operating in a current-limiting mode, according to an embodiment. The condition causing the power supply 10 to operate in the current-limiting mode may be, e.g., a low-impedance path between the supply output node 14 and the reference node 26 (FIG. 1). Causes of such a low-impedance path can include damage to the load 12, the coupling of an improper load, and a short circuit formed across the load (e.g., from a spilled conductive liquid such as water).

During a first portion $T_{on}$ of the switching period T of the transistor 36 (FIG. 1)—$T_{on}$ corresponds to the logic-high portion of the control signal 38 of FIG. 1—the transistor conducts the current $I_{switch}$ from $V_{in}$ through the inductor 18. Because the change in current di/dt through an inductor equals the voltage across the inductor over the inductance of the inductor, during $T_{on}$, $I_{switch}$ ramps up linearly from $I_{valley}$ at a time $t_0$ with a slope of $V_{in}/L$ (with the assumption that the voltage drop across the "on" transistor 36 is negligible). But because of the over-current condition, $I_{switch}$ increases to a threshold level $I_{limit}$ at a time $t_1$; that is, even if the load 12 is such that it would otherwise cause $I_{switch}$ to increase beyond the threshold level $I_{limit}$ to a peak level $I_{peak}$, the current limiter 30 prevents $I_{switch}$ from increasing beyond $I_{limit}$. A designer of the power supply 10 (FIG. 1) typically selects $I_{limit}$ such that the components (e.g., the transistor 36) of the power supply are not damaged while an over-current condition exists.

At the time $t_1$, the transistor 36 turns "off" such that $I_{switch}$ rapidly decreases to zero.

During the second portion $T_{off}$ of the switching period T of the transistor 36 (FIG. 1)—$T_{off}$ corresponds to the logic-low portion of the control signal 38 of FIG. 1—the transistor conducts no current, and, therefore, $I_{switch}$ remains at zero until a time $t_2$, which is the beginning of the next current-limiting-mode switching cycle.

Referring to FIGS. 1-5, if the over-current condition ceases to exist, then the power-supply controller 24 switches from the current-limit mode of operation, which is described above in conjunction with FIG. 5, to the normal mode of operation, which is described above in conjunction with FIGS. 2-4.

Referring to FIGS. 1-4, the operation of the power supply 10 while in the normal mode is described over a switching period T, according to an embodiment.

At the time $t_0$, the PWM controller 34 transitions the control signal 38 to a logic-high level, thus turning the transistor 36 "on".

During the portion $T_{on}$ of the switching period T from the time $t_0$ to the time $t_1$, the transistor 36 conducts the linearly ramping current $I_{switch}=I_{in}$ through the inductor 18, and, therefore, "charges" the inductor with magnetic energy.

The length of $T_{on}$ is determined, at least in part, by the negative feedback of $V_{out}$ to the error amplifier 32. For example, if $V_{out}$ is lower than a level set by $V_{ref}$, then the PWM controller 34 tends to lengthen the logic-high portion of the control signal 38 so as to lengthen $T_{on}$, and, therefore, so as to cause $V_{out}$ to increase toward the level set by $V_{ref}$. Conversely, if $V_{out}$ is higher than the level set by $V_{ref}$, then the PWM controller 34 tends to shorten the logic-high portion of the control signal 38 so as to shorten $T_{on}$, and, therefore, so as to cause $V_{out}$ to decrease toward the level set by $V_{ref}$. And although $V_{out}$ is described as being directly coupled to the inverting node of the error amplifier 32, a feedback signal related to, but not necessarily equal to, $V_{out}$ may be coupled to the error amplifier instead of $V_{out}$.

At the time $t_1$, the PWM controller 34 transitions the control signal 38 to a low-logic level so as to turn off the transistor 36, and, therefore, so as to cause $I_{switch}$ to fall rapidly from its peak level $I_{peak}$ to zero.

But, still at time $t_1$, because the inductor 18 is conducting $I_{switch}=I_{in}$ having a level of $I_{peak}$ immediately before the PWM controller 34 turns "off" the transistor 36, the current $I_{in}$ through the inductor does not rapidly fall to zero because, as is known, the current through an inductor does not change instantaneously.

Instead, starting at time $t_1$, the input current $I_{in}$ through the inductor 18 flows through the diode 20 such that the output current $I_{out}$ equals the input current $I_{in}$, i.e., $I_{out}=I_{in}$ ($I_{out}=0$ during $T_{on}$).

Because the power supply 10 is a boost converter, $|V_{out}|>|V_{in}|$.

Therefore, during the portion $T_{off}$ of the switching period T, the current $I_{out}=I_{in}$ through the inductor 18 decays, where the rate of decay is related to the difference $V_{out}-V_{in}$, which is the voltage across the inductor, with the assumption that the voltage across the diode 20 is comparatively negligible. Although the current $I_{out}=I_{in}$ may decay to zero at some time during the cycle portion $T_{off}$, it typically does not decay to zero such that, due to the filtering action of the inductor 18 and the capacitor 32, $I_{Load}$ equals the average of $I_{out}$, i.e., $I_{Load}=I_{out\_avg}$.

While operating in the normal mode, the power supply 10 repeats the above steps for each subsequent switching period T.

Referring to FIGS. 1 and 5, the operation of the power supply 10 while in the current-limiting mode is described over a switching period T, according to an embodiment.

At the time $t_0$, the PWM controller 34 transitions the control signal 38 to a logic-high level, thus turning the transistor 36 "on".

During the portion $T_{on}$ of the switching period T from the time $t_0$ to the time $t_1$, the transistor 36 conducts the linearly ramping current $I_{switch}=I_{in}$ through the inductor 18, and, therefore, "charges" the inductor with magnetic energy.

But unlike while operating in the normal mode, the power-supply controller 24 does not determine the length of $T_{on}$ by the negative feedback of $V_{out}$ to the error amplifier 32, because this would allow $I_{switch}=I_{in}$ to exceed a safe value. Consequently, while operating in the current-limiting mode, the switching regulator 28 does not regulate $V_{out}$; that is, $V_{out}$ is free to change from, and typically does change from, its regulated level.

Therefore, the current limiter 30 instead limits the peak level of $I_{switch}=I_{in}$ to $I_{limit}$ independently of the level of $V_{out}$. In more detail, the current sensor 40 converts the voltage across the conduction nodes of the transistor 36 (this voltage being proportional to $I_{switch}=I_{in}$) into a current-sense signal, which the current comparator 42 receives at its non-inverting ("+") node. When the current-sense signal becomes greater than $CL_{ref}$, the comparator 42 transitions its output signal from a logic-low level to a logic-high level, which causes the PWM controller 34 to transition the control signal 38 to a logic-low level, and, therefore, causes the PWM controller to turn off the transistor 36. That is, the current limiter 30 limits the duty cycle D of the signal 38 such that the peak levels of $I_{switch}$ and $I_{in}$ do not exceed $I_{limit}$, where $D=T_{on}/T$.

Still referring to FIGS. 1 and 5, at the time $t_1$, the PWM controller 34 transitions the control signal 38 to a low-logic level in response to the current limiter 30 so as to turn off the transistor 36, and, therefore, so as to cause $I_{switch}$ to decrease rapidly from the current-limit threshold to zero.

But, still at time $t_1$, because the inductor 18 is conducting $I_{switch}=I_{in}$ having a level of $I_{limit}$ immediately before the PWM controller 34 turns "off" the transistor 36, the current $I_{in}$ through the inductor does not fall to zero because, as is known, the current through an inductor does not change instantaneously.

Therefore, starting at the time $t_1$, the current $I_{in}$ through the inductor 18 flows through the diode 20 as the current $I_{out}$, such that $I_{out}=I_{in}$.

Even though the power supply 10 is a boost converter, whether $|V_{out}|>|V_{in}|$ during the current-limiting mode depends on the severity of the over-current condition (e.g., a true short circuit between the output node 14 and the reference node 26 (where the reference node is a ground node) would render $V_{out}=0$). But for purposes of example, it can be assumed that in most cases, even though during the current-limiting mode $V_{out}$ may decrease from its regulated level, $|V_{out}|>|V_{in}|$ still holds true, at least during the current-limiting action of the power supply 10.

Therefore, during the portion $T_{off}$ of the switching period T, the current $I_{out}=I_{in}$ through the inductor 18 decays, where the rate of decay is related to $V_{out}-V_{in}$, which is the voltage across the inductor, with the assumption that the voltage across the diode 20 is comparatively negligible. Whether the current $I_{out}=I_{in}$ decays to zero at some time during the portion $T_{off}$ of the period T depends on the cause of the overcurrent condition. But in many cases, $I_{out}=I_{in}$ does not decay to zero during $T_{off}$ such that due to the filtering action of the inductor 18 and the capacitor 22, $I_{load}$ equals the average of $I_{out}$, just as it does during the normal mode of operation.

Still referring to FIGS. 1 and 5, the power supply 10 repeats the above steps for each subsequent switching period T while the overcurrent condition persists.

If the overcurrent condition ends, then the power supply 10 transitions to the normal mode of operation as described above in conjunction with FIGS. 1-4. In more detail, if the overcurrent condition ends, then the output voltage $V_{out}$ increases to its regulated level, and this increase in $V_{out}$ decreases the duty cycle D of the control signal 38 such that the peak level $I_{peak}$ (FIG. 5) of $I_{switch}=I_{in}$ also decreases. As the peak level $I_{peak}$ (FIG. 5) of $I_{switch}=I_{in}$ decreases, the level of the current-sense signal from the current sensor 40 decreases to below $CL_{ref}$ such that the comparator 42 no longer transitions its output signal to a logic-high level. Therefore, control of the duty cycle D of the control signal 38 shifts from the current limiter 30 back to the feedback loop that includes the error amplifier 32.

Figure 6A:
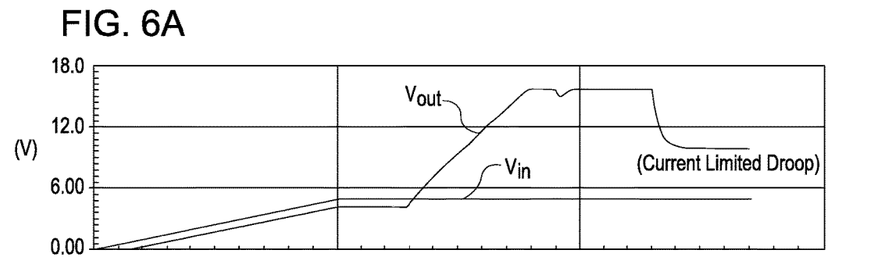
FIG. 6A is a time plot of the input and output voltages of the power supply of FIG. 1 while operating in a normal mode and while operating in a current-limiting mode, according to an embodiment.

FIG. 6A is a time plot of $V_{in}$ and $V_{out}$ of FIG. 1 while the power supply 10 is operating in the normal mode and in the current-limiting mode, and where $V_{in}=5$ V, $I_{Limit}=5$ A, and the supply regulates $V_{out}$ to 16 V while operating in the normal mode, according to an embodiment.

Figure 6B:
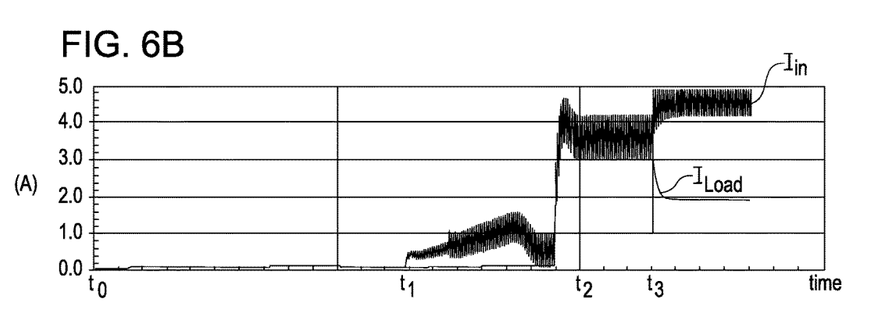
FIG. 6B is a time plot of the input and output currents of the power supply of FIG. 1 while operating in a normal mode and while operating in a current-limiting mode, according to an embodiment.

FIG. 6B is a time plot of the current $I_{in}$ through the inductor 18, and of the current $I_{Load}$ through the load 12, while the power supply 10 of FIG. 1 is operating as described above in conjunction with FIG. 6A, according to an embodiment.

Figure 7A:
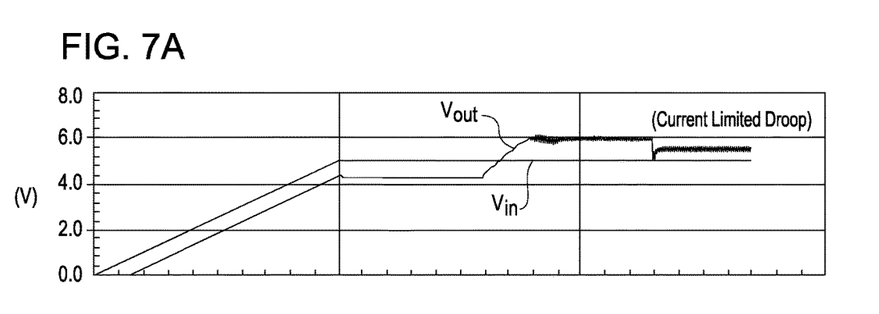
FIG. 7A is another time plot of the input and output voltages of the power supply of FIG. 1 while operating in a normal mode and while operating in a current-limiting mode, according to an embodiment.

Similarly, FIG. 7A is another time plot of $V_{in}$ and $V_{out}$ of FIG. 1 while the power supply 10 is operating in the normal mode and in the current-limiting mode, and where $V_{in}=5$ V, $I_{Limit}=5$ A, and the supply regulates $V_{out}$ to 6 V while operating in the normal mode, according to an embodiment.

Figure 7B:
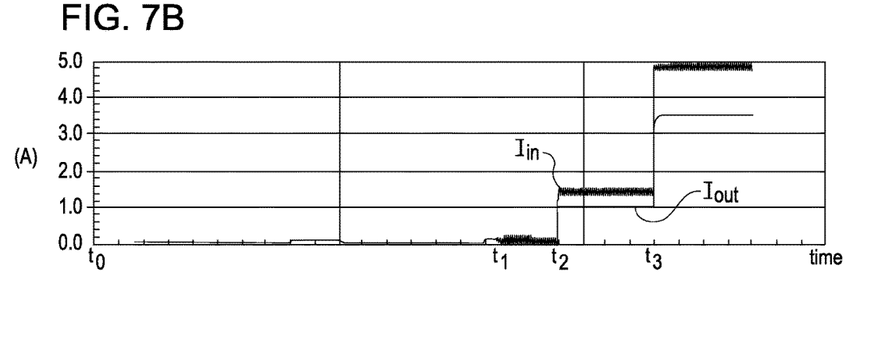
FIG. 7B is another time plot of the input and output currents of the power supply of FIG. 1 while operating in a normal mode and while operating in a current-limiting mode, according to an embodiment.

And FIG. 7B is another time plot of the currents $I_{in}$ and $I_{Load}$ while the power supply 10 of FIG. 1 is operating as described above in conjunction with FIG. 7A, according to an embodiment.

Referring to FIGS. 1-7B, a potential problem with the above-described current-limiting technique employed by the power supply 10 is that the level to which the supply limits $I_{load}$ may vary depending upon power-supply design factors such as the level of $V_{in}$ and the boost ratio $V_{out}/V_{in}$.

Unfortunately, this dependence of the current-limited level of $I_{Load}$ on such factors may be undesirable, because, to prevent damage to the load 12, a user of the power supply 10 may want the supply to limit $I_{Load}$ to a settable, or to at least a predictable, value that is independent of power-supply design factors.

For example, referring to FIGS. 1-6B, at a time $t_0$ of FIGS. 6A-6B the power supply 10 begins operating, at a time $t_1$ of FIGS. 6A-6B, the supply begins to boost $V_{out}$ to a level that is greater than the level of $V_{in}$, and at a time $t_2$ of FIGS. 6A-6B, the supply attains steady-state operation in the normal mode, during which the supply maintains $V_{out}=16$ V, $I_{peak}\approx4.2$ A, and $I_{Load}\approx3.6$ A—note that $I_{peak}$ is the actual peak level of $I_{in}$ while the supply is operating in the normal mode.

But at a time $t_3$ of FIGS. 6A-6B, the power supply 10 begins to operate in the current-limiting mode in response to an overcurrent condition, such that the power-supply controller 24 causes $V_{out}$ to droop to about 10 V, limits the peak level of the current $I_{in}$ to $I_{Limit}=5$ A, and limits $I_{Load}$ to approximately 2 A—note that $I_{Limit}$ is the actual peak level of $I_{in}$ while the supply is operating in the current-limiting mode.

Similarly, referring to FIGS. 1-5 and 7A-7B, at a time $t_0$ of FIGS. 7A-7B, the power supply 10 begins operating, at a time $t_1$ of FIGS. 7A-7B, the supply begins to boost $V_{out}$ to a level that is greater than the level of $V_{in}$, and at a time $t_2$ of FIGS. 7A-7B, the supply attains steady-state operation in the normal mode, during which the supply maintains $V_{out}=6$ V, $I_{peak} \approx 1.5$ A, and $I_{Load} \approx 1.0$ A—note that $I_{peak}$ is the actual peak level of $I_{in}$ while the supply is operating in the normal mode.

But at a time $t_3$ of FIGS. 7A-7B, the power supply 10 begins to operate in the current-limiting mode in response to an overcurrent condition, such that the power-supply controller 24 causes $V_{out}$ to droop to approximately 5.5 V, limits the peak level of $I_{in}$ to $I_{Limit}$=5 A, and limits $I_{Load}$ to approximately 3.5 A—note that $I_{Limit}$ is the actual peak level of $I_{in}$ while the supply is operating in the current-limiting mode.

Referring to FIGS. 6A-7B, although while operating in the current-limiting mode the power-supply controller 24 limits the peak level of $I_{switch}=I_{in}$ to $I_{Limit}$=5 A in both examples, the controller 24 limits $I_{Load}$ to a significantly different level (i.e., approximately 2 A and 3.5 A, respectively) in each example.

Furthermore, although in the first example the power-supply controller 24 limits $I_{Load}$ to a current-limiting-mode level (i.e., to approximately 2 A) that is less than its normal-mode level (i.e., approximately 3.6 A), in the second example, the controller 24 limits $I_{Load}$ to a current-limiting-mode level (i.e., approximately 3.5 A) that is significantly higher than its normal-mode level (i.e., approximately 1 A).

Unfortunately, the inconsistent limiting of $I_{Load}$ illustrated by the two above-described examples may be a problem for a user of the power supply 10. Although such a user may like to know the peak-limit threshold $I_{Limit}$ to which the power-supply controller 24 limits the switch and input currents $I_{switch}$ and $I_{in}$ while the power supply 10 is operating in the current-limiting mode, it is typically more important to the user that he/she know, or at least be able to predict, the level to which the controller 24 limits $I_{Load}$.

Referring again to FIG. 1, a technique that the power-supply controller 24 could employ for limiting $I_{Load}$ to a predictable level while the power supply 10 is operating in a current-limiting mode would be to monitor $I_{Load}$, and to limit $I_{Load}$ to a set threshold level.

But this technique may require the power-supply controller 24 to include an additional pin for receiving $I_{Load}$, or for receiving a signal that is related to $I_{Load}$, and may require the power supply 10 to include additional circuitry (e.g., a Hall-Effect sensor) for sensing $I_{Load}$.

Unfortunately, including an additional pin may increase the cost, footprint, or complexity, or decrease the efficiency, of the power-supply controller 24, and including additional circuitry may increase the cost, footprint, or complexity, or decrease the efficiency, of the power supply 10.

Still referring to FIG. 1, an embodiment of a technique for limiting $I_{Load}$ to a settable, or at least predictable, level entails limiting $I_{switch}$, and, therefore, limiting $I_{in}$ and $I_{Load}$, in response to the boost ratio $V_{out}/V_{in}$ of the power supply 10, or in response to a quantity that is related to the boost ratio.

From the theory of conservation of energy, it is also known that the power into an ideal converter, such as an ideal version of the power supply 10, equals the power out of the ideal converter (because there are no losses in an ideal converter) according to the following equation:

$$V_{in} \cdot I_{in\_avg} = V_{out} \cdot I_{out\_avg} \quad (1)$$

And assuming that the load 12 is purely resistive, due to the filtering action of the output filter capacitor 22, one can assume that $I_{out\_avg}=I_{load}$ in a steady state. Therefore, from equation (1), one can derive the following mathematical relations between $I_{in\_avg}$ and $I_{Load}$.

$$I_{in\_avg}/I_{load}=V_{out}/V_{in}=\text{Boost\_Ratio} \quad (2)$$

$$I_{Load}=I_{in\_avg} \cdot (V_{in}/V_{out})=I_{in\_avg}/\text{Boost\_Ratio} \quad (3)$$

And although the power supply 10 of FIG. 1 is not an ideal supply, the value of $I_{Load}$ given by these equations is accurate enough for purposes of current limiting.

Therefore, as further described below, because $I_{in\_avg}$, $V_{in}$, and $V_{out}$ are already received by, or determinable from, existing pins of the power-supply controller 24 of FIG. 1, one may be able to configure the power-supply controller and the power supply 10 of FIG. 1 to employ a current-limiting technique that uses the power-supply boost ratio with little or no increase in the cost, footprint, or complexity, and with little or no decrease in the efficiency, of the controller or supply.

Furthermore, it is also known that for an ideal version of the boost power supply 10 of FIG. 1:

$$V_{out}/V_{in}=\text{Boost\_Ratio}=1/(1-D) \quad (4)$$

where $D=T_{on}/T$ is the duty cycle of the control signal 38, which drives the switching transistor 36.

Similarly for an ideal version of a buck-boost power supply (not shown)

$$V_{out}/V_{in}=\text{Boost\_Ratio}=D/(1-D) \quad (5)$$

Figure 8:
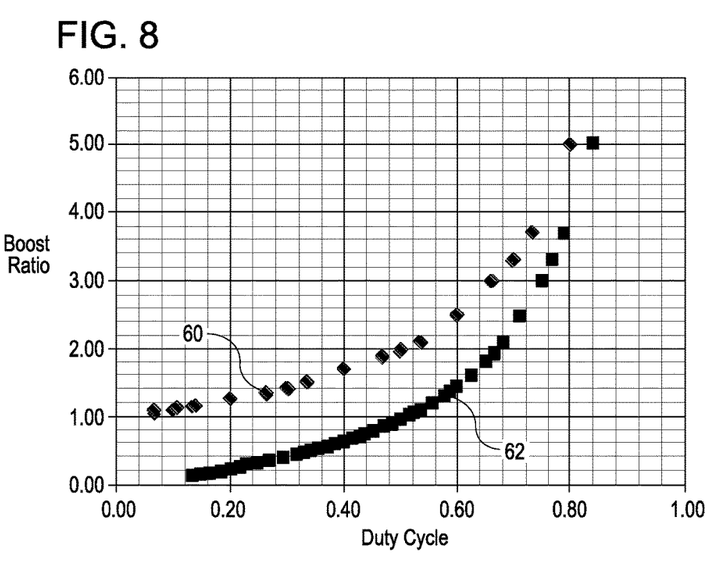
FIG. 8 is a plot of the boost ratio of the power supply of FIG. 1 versus the duty cycle of the power supply of FIG. 1, according to an embodiment.

FIG. 8 is a plot 60 of the Boost_Ratio versus the duty cycle D for an ideal version of the boost power supply 10 of FIG. 1, and a plot 62 of the boost ratio versus the duty cycle for an ideal version of a buck-boost power supply (not shown), according to equations (4) and (5), respectively, for $0 \leq D < 1$.

From equations (3) and (4), one can derive the following equation for an ideal version of the boost power supply 10 of FIG. 1:

$$I_{Load}=(1-D) \cdot I_{in\_avg}=(1-D) \cdot (I_{valley}+(I_{peak}-I_{valley})/2) \quad (6)$$

Referring to FIG. 1 and equation (6), because the PWM controller 34 generates the control signal 38, the duty cycle D is also available to the power-supply controller 24 as a quantity related to the Boost_Ratio.

Figure 9:
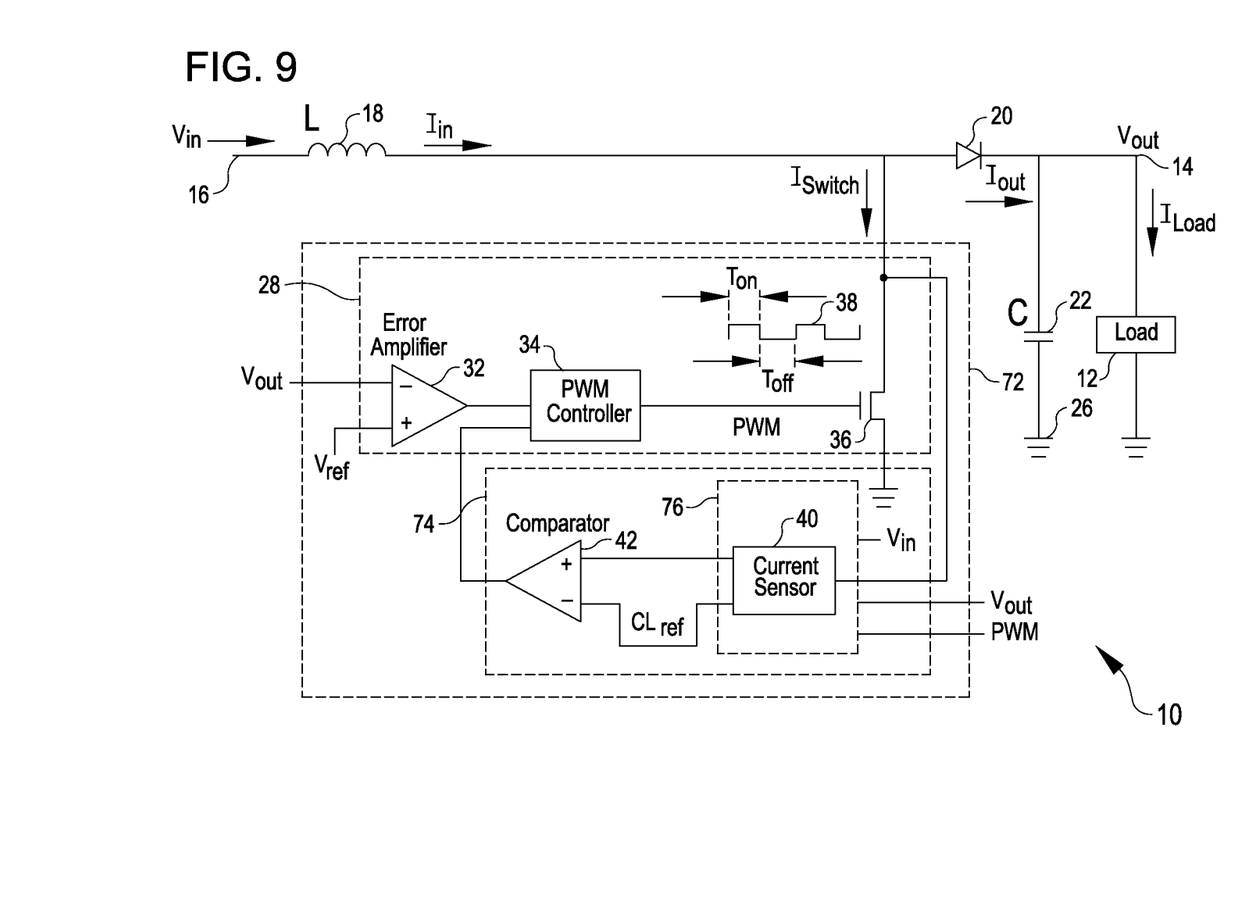
FIG. 9 is a diagram of power supply that includes a power-supply controller, according to another embodiment.

FIG. 9 is an embodiment of a power supply 70, which is configured to employ a technique for limiting $I_{Load}$ to a settable, or at least to a predictable, level in response to the Boost_Ratio=$V_{out}/V_{in}$ of the power supply, or in response to a quantity that is related to the Boost_Ratio, according to an embodiment. As described below, the power supply 70 so limits $I_{Load}$ by limiting the peaks of $I_{switch}$ and $I_{in}$ in response to the Boost_Ratio, or in response to a quantity that is related to the Boost_Ratio. Furthermore, each component of the power supply 70 that is similar to a respective component of the power supply 10 of FIG. 1 is labeled with the same reference number in both FIGS. 1 and 9, and is not described again for the sake of brevity.

The power supply 70 of FIG. 9 includes a power-supply controller 72, which, in addition to the switching regulator 28, includes a current limiter 74.

In addition to the comparator 42, the current limiter 74 includes a current-limit controller 76, which includes the current sensor 40, and which receives, in addition to the voltage across the transistor 36, $V_{in}$, $V_{out}$, and the PWM control signal 38.

Therefore, while the power supply 70 is operating in a current-limiting mode, the power-supply controller 72 may determine the level of $I_{Load}$ according to equation (3), and generate and vary $CL_{ref}$ in response to the determined value of $I_{Load}$ so as to limit $I_{Load}$ to a set threshold level. For example, if $I_{Load}$ is to be limited to 1 A, but the initial set switch current limit threshold is $I_{Limit}$=5 A, then in response to the conditions of operation, the power-supply controller 72 is configured to adjust (e.g., to lower) the level of $CL_{ref}$. The power-supply controller 72 continues adjusting $CL_{ref}$, determining the level of $I_{Load}$ per equation (3), and monitoring this level until the load current is less than or equal to the threshold limit level of 1 A. That is, the controller 72 uses negative feedback of $I_{in}$, $V_{out}$, and $V_{in}$ to adjust the peak levels of $I_{switch}$ and $I_{in}$ until the level of $I_{Load}$ obtained by solving equation (3) is less than or equal to the threshold limit level, which is 1 A in the above example.

Still referring to FIG. 9, alternatively, the power-supply controller 72 may determine the level of $I_{Load}$ according to equation (6), and generate and vary (e.g., lower) $CL_{ref}$ in response to the determined level of $I_{Load}$ so as to limit $I_{Load}$ to the threshold limit level. For example, if $I_{Load}$ is to be limited to 1 A, but the switch limit level is $I_{Limit}$=5 A, then the power-supply controller 72 adjusts the level of $CL_{ref}$, which adjusts (e.g., reduces) $T_{on}$, and, therefore, the duty cycle D, of the control signal 38 by adjusting the time during the period T when the comparator 42 transitions its output to a logic-high level. The power-supply controller 72 continues adjusting $CL_{ref}$, determining a level for $I_{Load}$ per equation (6), and monitoring this determined level until the determined level is less than or equal to the threshold level 1 A. That is, the power-supply controller 72 uses feedback of $I_{in}$ and the duty cycle D to adjust $I_{in}$ until the level of $I_{Load}$ obtained by solving equation (6) is less than or equal to the threshold limit level.

The power-supply controller 72 may determine the values of $I_{valley}$ and $I_{peak}$ in equation (6) by measuring the voltages across the transistor 36 at respective times $t_0$ and $t_1$ of FIGS. 2-4 and by dividing these voltages by the on resistance $RDS_{on}$ of the transistor. Alternatively, because the difference $I_{peak}-I_{valley}$ may be considered negligible compared to $I_{valley}$, the power-supply controller 72 may approximate $I_{in\_avg}$ as being equal either to $I_{valley}$ or to $I_{peak}$, or to $I_{valley}+(I_{peak}-I_{valley})/2$. Furthermore, there are other conventional techniques for determining $I_{in\_avg}$ that the power-supply 72 may employ.

Referring to FIGS. 2-5 and 9, the operation of the power supply 70 is described, according to an embodiment.

Referring to FIGS. 2-4 and 9, while the power supply 70 is operating in a normal mode, it operates in a manner similar to the manner in which the power supply 10 of FIG. 1 operates while in a normal mode as described above in conjunction with FIGS. 1-4.

Referring to FIGS. 5 and 9, while operating in a current-limit mode, the power supply 70 limits $I_{Load}$ to a threshold level without directly sensing $I_{Load}$.

When the power supply 70 first enters the current-limiting mode, the current limiter 74 limits the peak levels of $I_{switch}$ and $I_{in}$ to $I_{Limit}$ as described above in conjunction with FIGS. 1 and 5.

Furthermore, the current-limit controller 76 determines a level for $I_{Load}$ per equation (3) or equation (6). For example, if determining a level for $I_{Load}$ per equation (3), then the controller 76 may include circuitry that calculates $I_{in\_avg}=(I_{valley}+(I_{Limit}-I_{valley})/2)$, and that divides $V_{out}$ by $V_{in}$ to calculate the Boost_Ratio. Alternatively, if determining a level for $I_{Load}$ per equation (6), then the controller 76 may include circuitry that calculates $I_{in\_avg}=(I_{valley}+(I_{Limit}-I_{valley})/2)$, calculates the duty cycle D by dividing the time $T_{on}$ by the period T, and calculates 1−D.

Next, the current-limit controller 76 compares the level determined for $I_{load}$ to the load-current limit threshold.

If the level determined for $I_{Load}$ is less than or equal to the load-current limit threshold, then the current-limit controller 76 maintains $CL_{ref}$ at its current level.

But if the level determined for $I_{Load}$ is greater than the load-current limit threshold, then the current-limit controller 76 adjusts (e.g., lowers) the level of $CL_{ref}$ as needed to reduce $I_{Load}$; the controller 76 may using a dithering technique to determine whether raising or lowering the level of $CL_{ref}$ reduces $I_{Load}$, and may adjust the level of $C_{Lref}$ in steps, or according to a continuous slope, to prevent oscillation.

Then, the current-limit controller 76 continues to determine a level for $I_{Load}$, to compare this level to the load-current limit threshold, and to adjust the level of $CL_{ref}$ until the determined level of $I_{Load}$ is less than or equal to the load-current limit threshold.

If the cause of the overcurrent condition is removed, then $I_{Load}$ will decrease to below the load-current limit threshold, and in response, the current-limit controller 76 will set the level of $CL_{ref}$ back to its normal-mode level.

Still referring to FIGS. 5 and 9, alternate embodiments of the current-limit mode are contemplated. For example, the actions described above may be performed in any suitable order, one or more of the actions may be omitted, and one or more other actions may be added.

Figure 10:
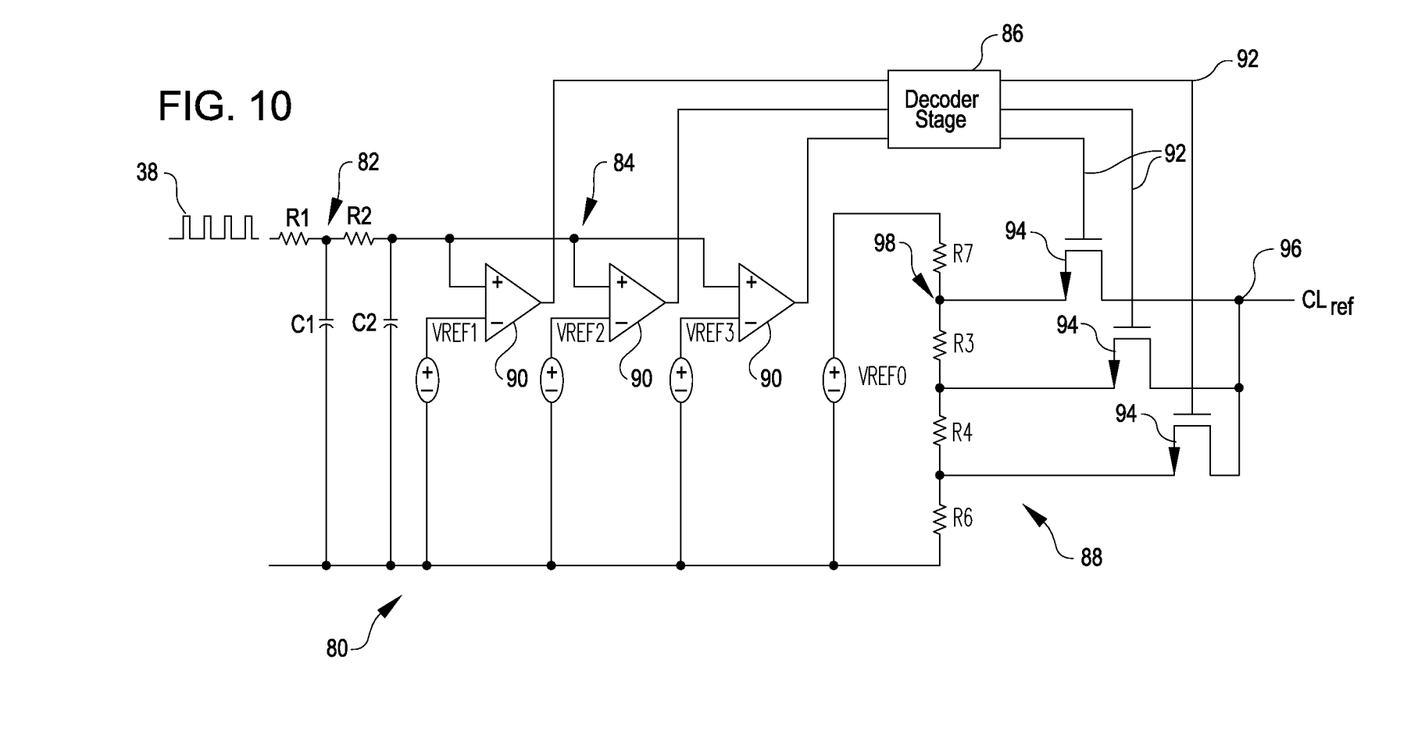
FIG. 10 is a diagram of a current-limit-reference generator of the power-supply controller of FIG. 9, according to an embodiment.

Referring to FIGS. 9 and 10, an embodiment of the power supply 70 that uses only the duty cycle D to adjust $CL_{ref}$ is described, according to an embodiment.

FIG. 10 is a diagram of a circuit 80, which is configured to generate $CL_{ref}$ in response to the duty cycle D of the control signal 38, and which may be disposed on the current-limit controller 76 of FIG. 9, according to an embodiment.

The circuit 80 includes a filter stage 82, a comparator stage 84, a decoder stage 86, and a reference-generator stage 88.

The filter stage 82 converts the control signal 38 into its average DC value, which is proportional to the duty cycle D.

The comparator stage 84 includes one or more comparators 90 (here three comparators) that each compare the DC value of the control signal 38 from the filter stage 82 to a respective reference voltage VREF (these reference voltages may be different than the reference voltage $V_{ref}$ of FIG. 9).

The decoder stage 86 receives the one or more comparator-generated output signals from the comparator stage 84, and generates, in response to these one or more output signals, one or more control signals 92.

The reference-generator stage 88 includes one or more switches 94, which couple a voltage that corresponds to the one or more control signals 92 to a $CL_{ref}$ node 96; that is, $CL_{ref}$ equals the voltage that the stage 88 couples to the node 96. In an embodiment, the one or more voltages that the switches 94 may couple to the node 96 are generated by a resistive voltage divider 98 and another reference voltage VREF (this reference voltage may be different than the reference voltage $V_{ref}$ of FIG. 9 and the reference voltages VREF of the comparator stage 84).

Referring to FIGS. 2-4 and 9-10, while in the normal mode, the power supply 70 operates in a manner similar to manner in which the power supply 10 of FIG. 1 operates during the normal mode as described above in conjunction with FIGS. 1-4.

Referring to FIGS. 5 and 9-10, while the power supply 70 is operating in the current-limiting mode, the circuit 80 adjusts $CL_{ref}$ in response to the duty cycle D of the control signal 38 so as to cause $I_{Load}$ to be less than or equal to the load-current limit threshold. If the overcurrent condition ends, then the duty cycle D returns to its steady-state-normal-operation value, and, in response, the circuit 80 returns $CL_{ref}$ to its normal-operation level. Referring to FIG. 5, even though in this embodiment $I_{load}$ is not determined in response to $I_{in\_avg}$, the duty cycle D increases in response to the overcurrent condition because $I_{Limit}$ (FIG. 5) is greater than the normal-mode level of $I_{peak}$ (FIGS. 2-4). Therefore, when D increases beyond a threshold level set by the circuit 80, this circuit adjusts $CL_{ref}$ so as to reduce $I_{Load}$ to a lower, more predictable, level.

Two examples that illustrate that the power supply 70 of FIG. 9 can limit $I_{Load}$ to a predictable, or a settable, threshold limit are described below in conjunction with FIGS. 11A-12B, according to an embodiment.

Figure 11A:
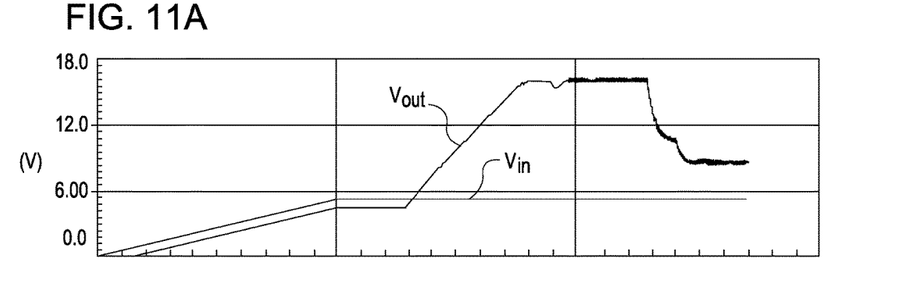
FIG. 11A is a time plot of the input and output voltages of the power supply of FIG. 9 while operating in a normal mode and while operating in a current-limiting mode, according to an embodiment.

FIG. 11A is a time plot of $V_{in}$ and $V_{out}$ of FIG. 9 while the power supply 70 is operating in the normal mode and in the current-limiting mode, and where $V_{in}$=5 V, $I_{limit}$ (the limit threshold for the peaks of $I_{switch}$ and $I_{in}$)=5 A, the load-current limit threshold for $I_{Load}$ is 1.5 A, and the supply regulates $V_{out}$ to 16 V while operating in the normal mode, according to an embodiment.

Figure 11B:
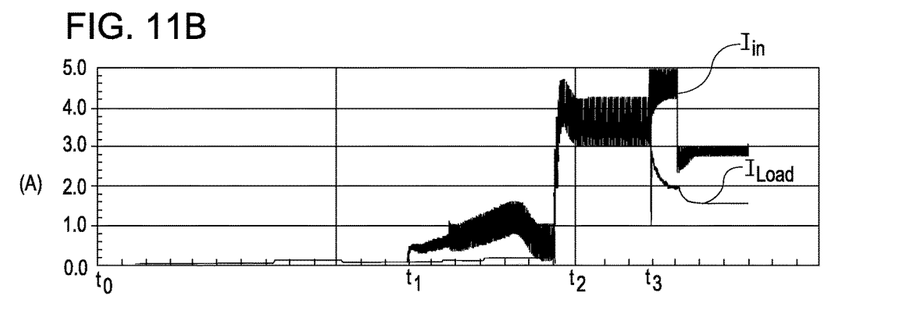
FIG. 11B is a time plot of the input and output currents of the power supply of FIG. 9 while operating in a normal mode and while operating in a current-limiting mode, according to an embodiment.

FIG. 11B is a time plot of the current $I_{in}$ through the inductor 18, and of the current $I_{Load}$ through the load 12, while the power supply 70 of FIG. 9 is operating as described above in conjunction with FIG. 11A, according to an embodiment.

Figure 12A:
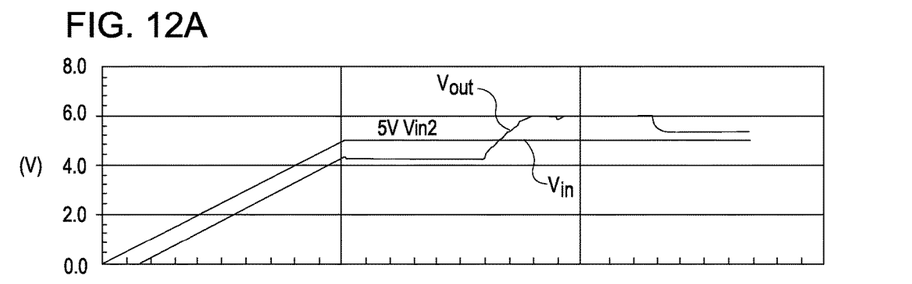
FIG. 12A is another time plot of the input and output voltages of the power supply of FIG. 9 while operating in a normal mode and while operating in a current-limiting mode, according to an embodiment.

Similarly, FIG. 12A is a time plot of $V_{in}$ and $V_{out}$ of FIG. 9 while the power supply 70 of FIG. 9 is operating in the normal mode and in the current-limiting mode, and where $V_{in}$=5 V, $I_{limit}$=5 A, the load-current limit threshold for $I_{Load}$ is 1.5 A, and the supply regulates $V_{out}$ to 6V while operating in the normal mode, according to an embodiment.

Figure 12B:
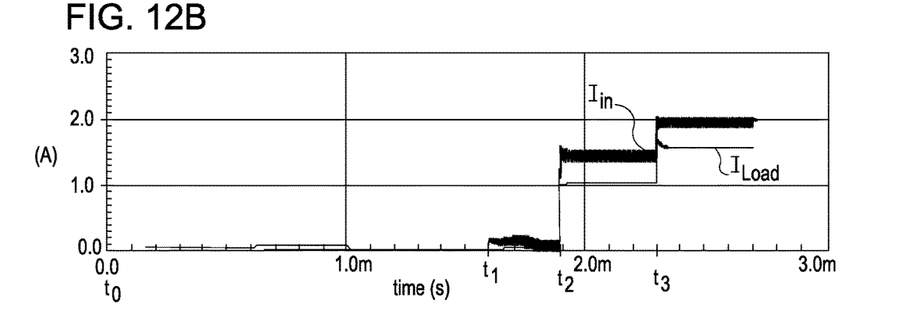
FIG. 12B is another time plot of the input and output currents of the power supply of FIG. 9 while operating in a normal mode and while operating in a current-limiting mode, according to an embodiment.

And FIG. 12B is a time plot of the currents $I_{in}$ and $I_{load}$ while the power supply 70 of FIG. 9 is operating as described above in conjunction with FIG. 12A, according to an embodiment.

For example, referring to FIGS. 2-4, 9, and 11A-11B, at a time $t_0$ of FIGS. 11A-11B, the power supply 70 begins to operate, at a time $t_1$ of FIGS. 11A-11B, the supply begins to boost $V_{out}$ to a level that is greater than the level of $V_{in}$, and at a time $t_2$ of FIGS. 11A-11B, the supply attains a steady-state operation in the normal mode, during which it maintains $V_{out}$=16 V, $I_{peak}\approx$14.2 A, and $I_{load}\approx$3.6 A.

But at a time $t_3$ of FIGS. 11A-11B, referring also to FIGS. 5 and 9, the power supply 70 begins to operate in the current-limiting mode in response to an overcurrent condition, such that the power-supply controller 72 causes $V_{out}$ to droop to about 8 V, initially limits the peak levels of the switch and input currents $I_{switch}$ and $I_{in}$ to $I_{Limit}$=5 A, and then limits the peak levels of the switch and input currents $I_{switch}$ and $I_{in}$ to approximately 3 A as the current limiter 74 limits $I_{Load}$ to the set threshold of 1.5 A.

Similarly, referring to FIGS. 2-4, 9, and 12A-12B, at a time $t_0$ of FIGS. 12A-12B, the power supply 70 begins to operate, at a time $t_1$ of FIGS. 12A-12B the supply begins to boost $V_{out}$ to a level that is greater than the level of $V_{in}$, and at a time $t_2$ of FIGS. 12A-12B, the supply attains steady-state operation in the normal mode, during which the supply maintains $V_{out}$=6 V, $I_{peak}\approx$1.5 A, and $I_{load}\approx$1.0 A.

But at a time $t_3$ of FIGS. 12A-12B, referring also to FIGS. 5 and 9, the power supply 70 begins to operate in the current-limiting mode in response to an overcurrent condition, such that the power-supply controller 24 causes $V_{out}$ to droop to approximately 5.5 V, limits the peak levels of the switch and input currents $I_{switch}$ and $I_{in}$ to $I_{Limit}\approx$2 A, and limits $I_{Load}$ the load-current limit threshold of 1.5 A.

Therefore, referring to FIGS. 11A-12B, unlike the power supply 10 of FIG. 1, the power supply 70 of FIG. 9 limits $I_{Load}$ to the limit threshold of 1.5 A independently of power-supply-design and power-supply-implementation factors such as $V_{in}$, $V_{out}$, the peak switch/input current limit $I_{Limit}$, and the Boost_Ratio=$V_{out}/V_{in}$.

Referring to FIGS. 9-12B, alternate embodiments of the power supply 70 are contemplated. For example, the power-supply controller 72 may be implemented in hardware, firmware, or software, or in any combination of or sub-combination thereof. Furthermore, the current-limit controller 72 may not receive $V_{out}$ and $V_{in}$ if it uses only the duty cycle D of the control signal 38 to limit $I_{switch}$, $I_{in}$, and $I_{Load}$ in the current-limit mode, and may not receive the control signal 38 if it uses only the Boost_Ratio=$V_{out}/V_{in}$ to limit $I_{switch}$, $I_{in}$, and $I_{Load}$ in the current-limit mode. Moreover, the current-limit controller 76 may use quantities that are related to the Boost_Ratio other than the duty cycle D to limit $I_{switch}$, $I_{in}$, and $I_{Load}$ during the current-limit mode of operation. In addition, a power supply having a topology other than a boost-converter topology (e.g., a buck-boost topology, or a flyback topology where $I_{Load}$=[(1–D)/D]·$I_{in\_avg}$) may employ one of the above-described embodiments for limiting $I_{switch}$, $I_{in}$, and $I_{Load}$.

Figure 13:
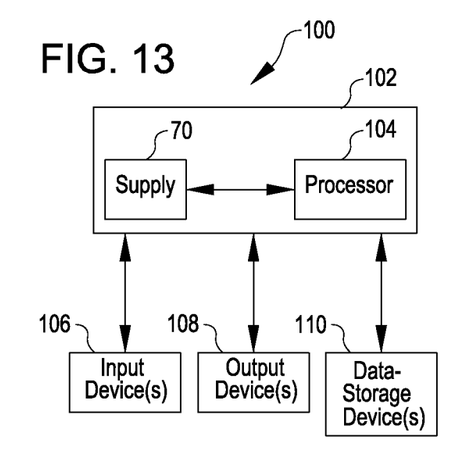
FIG. 13 is a diagram of a system that incorporates the power supply of FIG. 9, according to an embodiment.

FIG. 13 is a block diagram of an embodiment of a computer system 100, which incorporates the power supply 70 of FIG. 9, according to an embodiment. Although the system 100 is described as a computer system, it may be any system for which an embodiment of the power supply 70 is suited.

The system 100 includes computing circuitry 102, which, in addition to the supply 10, includes a processor 104 powered by the supply, at least one input device 106, at least one output device 108, and at least one data-storage device 110.

In addition to processing data, the processor 104 may program or otherwise control the supply 70. For example, the functions of the power-supply controller 72, PWM controller 34, and current-limit controller 76 (FIG. 9) may be performed by the processor 104.

The input device (e.g., keyboard, mouse) 106 allows the providing of data, programming, and commands to the computing circuitry 102.

The output device (e.g., display, printer, speaker) 108 allows the computing circuitry 102 to provide data in a form perceivable by a human operator.

And the data-storage device (e.g., flash drive, hard disk drive, RAM, optical drive) 110 allows for the storage of, e.g., programs and data.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A power supply controller, comprising:
a switching regulator configured to operate a power supply switch at a duty cycle so as to generate an input current in response to an input voltage and to generate an output voltage and an output current in response to the input current; and
a current limiter configured to limit the output current to a limit threshold, regardless of a level of the output voltage, by limiting a switch current through the power supply switch in response to an estimate of an average of the output current, the current limiter configured to estimate the average of the output current equal to a product of an average of the input current and a value representative of a ratio of the input voltage divided by the output voltage, the current limiter further configured to estimate the average of the output current without directly measuring the output current and without using a directly measured value of the output current.

2. The power supply controller of claim 1 wherein the switching regulator is configured to generate a control signal for operating the power supply switch, the control signal having the duty cycle.

3. The power supply controller of claim 1, further comprising:
the power supply switch; and
wherein the switching regulator is configured to generate a control signal for operating the power supply switch, the control signal having the duty cycle.

4. The power supply controller of claim 2, wherein the value equals unity minus the duty cycle.

5. The power supply controller of claim 2, wherein the value equals a difference divided by the duty cycle, the difference being equal to unity minus the duty cycle.

6. The power supply controller of claim 1, wherein the value equals the input voltage divided by the output voltage.

7. The power supply controller of claim 1 wherein the output voltage includes a regulated output voltage.

8. The power supply controller of claim 1 wherein the output voltage is not galvanically isolated from the input voltage.

9. The power supply controller of claim 1 wherein the switching regulator is configured to generate the input current such that the input current flows from the input voltage to the output voltage.

10. A power supply, comprising:
an input node configured to receive an input voltage;
an output node configured to carry an output voltage and to provide a load current;
a switch configured to conduct an input current from the input node in response to a control signal having a duty cycle; and
a power supply controller, including
a switch controller configured to generate the control signal, and
a current limiter configured to estimate a magnitude of the load current equal to a quotient of an average of the input current and a value representative of a ratio of the output voltage divided by the input voltage without directly measuring the magnitude of the load current and without using a directly measured magnitude of the load current, and to limit the input current in response to the estimated magnitude of the load current by controlling the duty cycle of the control signal such that the estimated magnitude of the load current does not exceed a load current limit threshold regardless of a level of the output voltage.

11. The power supply of claim 10 wherein the switch includes a transistor having a control node configured to receive the control signal.

12. The power supply of claim 10, further comprising:
an inductor coupled between the input node and the switch and configured to conduct the input current during a first portion of a cycle of the switch and to conduct a discharge current during a second portion of the cycle; and
a unidirectional current device coupled between the inductor and the output node and configured to conduct the discharge current during the second portion of the cycle.

13. The power supply of claim 10, further comprising:
a reference node;
an inductor coupled between the input node and the switch and configured to conduct the input current during a first portion of a cycle of the switch and to conduct a discharge current during a second portion of the cycle;
a unidirectional current device coupled between the inductor and the output node and configured to conduct the discharge current during the second portion of the cycle; and
a capacitor coupled between the output node and the reference node.

14. The power supply of claim 10 wherein the output voltage includes a regulated output voltage.

15. The power supply of claim 10 wherein the output node is not galvanically isolated from the input node.

16. The power supply of claim 10 wherein the switch is configured:
to conduct the input current from the input node in response to the control signal having a first value; and
to allow the input current to flow to the output node in response to the control signal having a second value.

17. The power supply of claim 10 wherein the value representative of the ratio of the output voltage divided by the input voltage equals the output voltage divided by the input voltage.

18. The power supply of claim 10 wherein the value representative of the ratio of the output voltage divided by the input voltage equals an inverse of one minus the duty cycle.

19. The power supply of claim 10 wherein the value representative of the ratio of the output voltage divided by the input voltage equals a ratio of the duty cycle divided by one minus the duty cycle.

20. A system, comprising:
a load configured to conduct a load current; and
a power supply, including
an input node configured to receive an input voltage,
an output node configured to provide the load current and an output voltage to the load,
a switch configured to conduct an input current from the input node in response to a control signal having a duty cycle, and
a power supply controller, including
a switch controller configured to generate the control signal, and
a current limiter configured to limit the load current to a limit threshold, regardless of a level of the output voltage, by controlling the duty cycle of the control signal in response to an estimate of the load current, the current limiter further configured to generate the estimate the load current equal to a product of an average of the input current and a value representative of a ratio of the input voltage divided by the output voltage without directly measuring the load current and without using a directly measured value of the load current.

21. The system of claim 20 wherein the power supply includes a boost converter.

22. The system of claim 20 wherein the load includes an integrated circuit.

23. The system of claim 20 wherein the load and a portion of the power supply are disposed on a same integrated circuit die.

24. The system of claim 20 wherein the load and a portion of the power supply are disposed on respective integrated circuit dies.

25. The system of claim 20 wherein the output voltage includes a regulated output voltage.

26. The system of claim 20 wherein the load is not galvanically isolated from the input node.

27. The system of claim 20 wherein the switch is configured:
to conduct the input current from the input node in response to the control signal having a first value; and
to allow the input current to flow to the load in response to the control signal having a second value.

28. A method, comprising:
generating an input current according to a duty cycle;
generating an output voltage and a load current in response to an input voltage and the input current;
limiting a peak magnitude of the input current to a limit level in response to an overcurrent condition and regardless of a magnitude of the output voltage;
determining a magnitude of the load current equal to a product of an average of the input current and a value representative of a ratio of the input voltage over the output voltage without directly measuring the load current and without using a directly measured value of the load current; and
reducing a magnitude of the limit level if the determined magnitude of the load current exceeds a load current threshold.

29. The method of claim 28 wherein:
generating the output voltage includes periodically causing the input current to flow according to the duty cycle; and
the value is related to the duty cycle.

30. The method of claim 28 wherein generating the output voltage includes causing the output voltage to have a magnitude that is greater than a magnitude of the input voltage.

31. The method of claim 28, further comprising:
generating an output current in response to the input voltage and the input current;
wherein generating the load current includes generating the load current in response to the output current; and
limiting the output current in response to the value.

32. The method of claim 28 wherein the output voltage includes a regulated output voltage.

33. The method of claim 28 wherein the output voltage is not galvanically isolated from the input current.

34. The method of claim 28 wherein generating the output voltage includes causing the input current to flow to the output voltage.

35. A method, comprising:
generating an output voltage, an output current, and a load current in response to an input voltage by switching an input current at a duty cycle;
limiting the output current to an output limit level in response to an overcurrent condition and independently of a level of the output voltage by limiting a peak magnitude of the input current to an input limit level;
estimating a magnitude of the load current equal to quotient of an average of the input current and a value representative of a ratio of the output voltage over the input voltage without directly measuring the magnitude of the load current and without using a directly measured magnitude of the load current; and
adjusting the input limit level if the estimated magnitude of the load current exceeds a load current threshold.

36. The method of claim 35 wherein the output voltage includes a regulated output voltage.

37. The method of claim 35 wherein the output current is not galvanically isolated from the input voltage.

38. The method of claim 35 wherein generating the output voltage includes causing the output current to flow from the input voltage.

* * * * *

UNITED STATES PATENT AND TRADEMARK OFFICE
CERTIFICATE OF CORRECTION

PATENT NO. : 9,740,218 B2
APPLICATION NO. : 13/828833
DATED : August 22, 2017
INVENTOR(S) : Dagan et al.

It is certified that error appears in the above-identified patent and that said Letters Patent is hereby corrected as shown below:

In Column 4, Line 57, delete "capacitor 32," and insert -- capacitor 22, --, therefor.

In Column 5, Line 33, delete "threshold to" and insert -- threshold $l_{limit}$ to --, therefor.

In Column 9, Lines 42-43, delete "power-supply 72" and insert -- power-supply controller 72 --, therefor.

In Column 11, Line 44, delete "$I_{peak} \approx 14.2$ A," and insert -- $I_{peak} \approx 4.2A$, --, therefor.

In Column 12, Lines 11-12, delete "current-limit controller 72" and insert -- current-limit controller 76 --, therefor.

Signed and Sealed this
Twenty-first Day of August, 2018

Andrei Iancu
*Director of the United States Patent and Trademark Office*